Sept. 20, 1949.                    C. W. SINCLAIR                    2,482,378
                       SECURING MEANS FOR DEMOUNTABLE WHEELS
Filed June 21, 1948                                            2 Sheets-Sheet 1
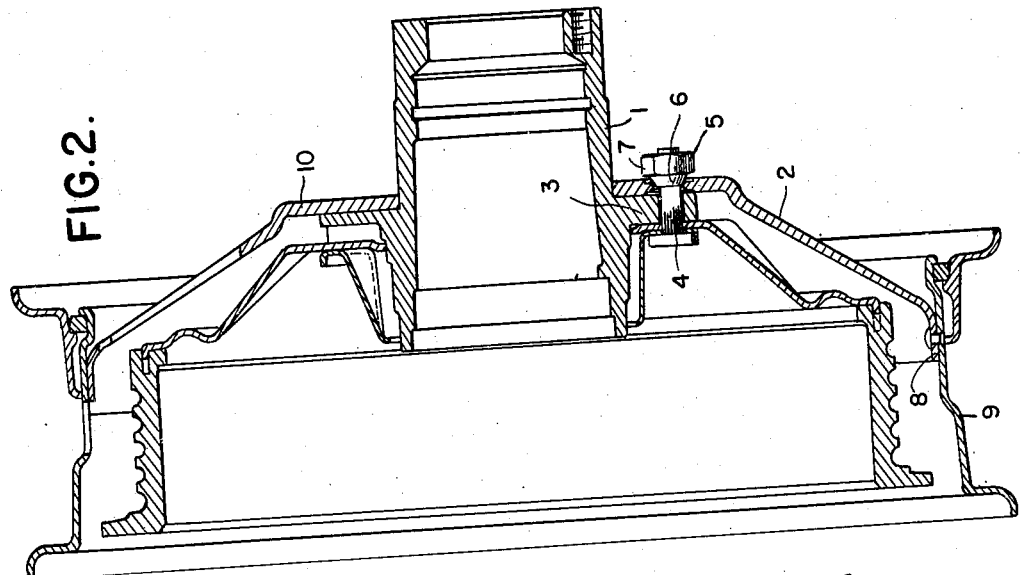
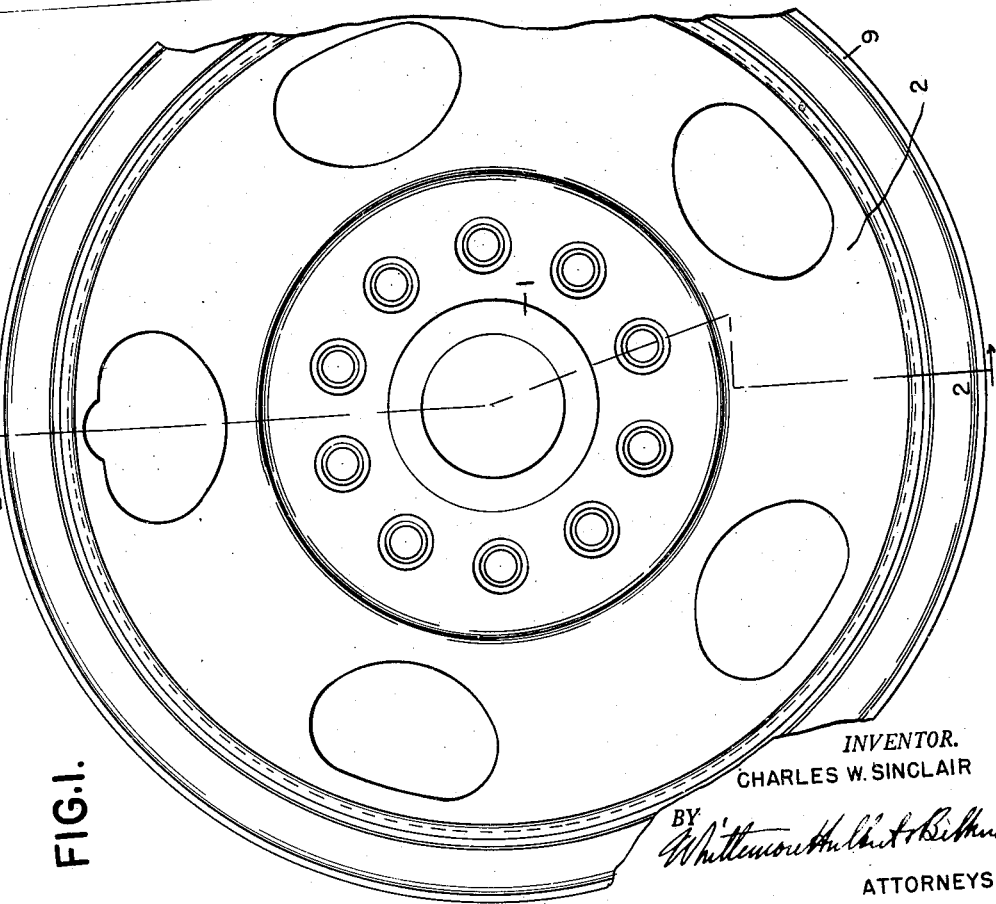
INVENTOR.
CHARLES W. SINCLAIR
BY
ATTORNEYS Sept. 20, 1949.　　　　C. W. SINCLAIR　　　2,482,378
SECURING MEANS FOR DEMOUNTABLE WHEELS
Filed June 21, 1948　　　　　　　　　　2 Sheets-Sheet 2

*INVENTOR.*
CHARLES W. SINCLAIR

BY Whittemore Hulbert & Belknap

ATTORNEYS

Patented Sept. 20, 1949

2,482,378

UNITED STATES PATENT OFFICE 2,482,378

SECURING MEANS FOR DEMOUNTABLE WHEELS

Charles W. Sinclair, Detroit, Mich., assignor to Kelsey-Hayes Wheel Company, Detroit, Mich., a corporation of Delaware Application June 21, 1948, Serial No. 34,216

3 Claims. (Cl. 301—9)

1

The invention relates to vehicle wheels and refers more particularly to wheels for use with motor vehicles and of that type having a wheel body demountably secured to a hub member.

The invention has for one of its objects to so construct the wheel body that it may be effectively secured to the hub member and the securing means effectively held from accidental disengagement by making both resilient and flexible the parts of the wheel body engageable by the nuts for securing the wheel body and by making the resilient and flexible parts with concave sockets for receiving convex bosses on the nuts.

The invention has for another object to form the wheel body in a manner such that it may be reversibly mounted upon the hub member and employed in conjunction with a similar wheel body to form a dual wheel.

With these and other objects in view, the invention resides in the novel features of construction as more fully hereinafter set forth.

In the drawings:

Figure 1 is an elevation of a vehicle wheel embodying the invention;

Figure 2 is a cross section on the line 2—2 of Figure 1;

Figure 4:
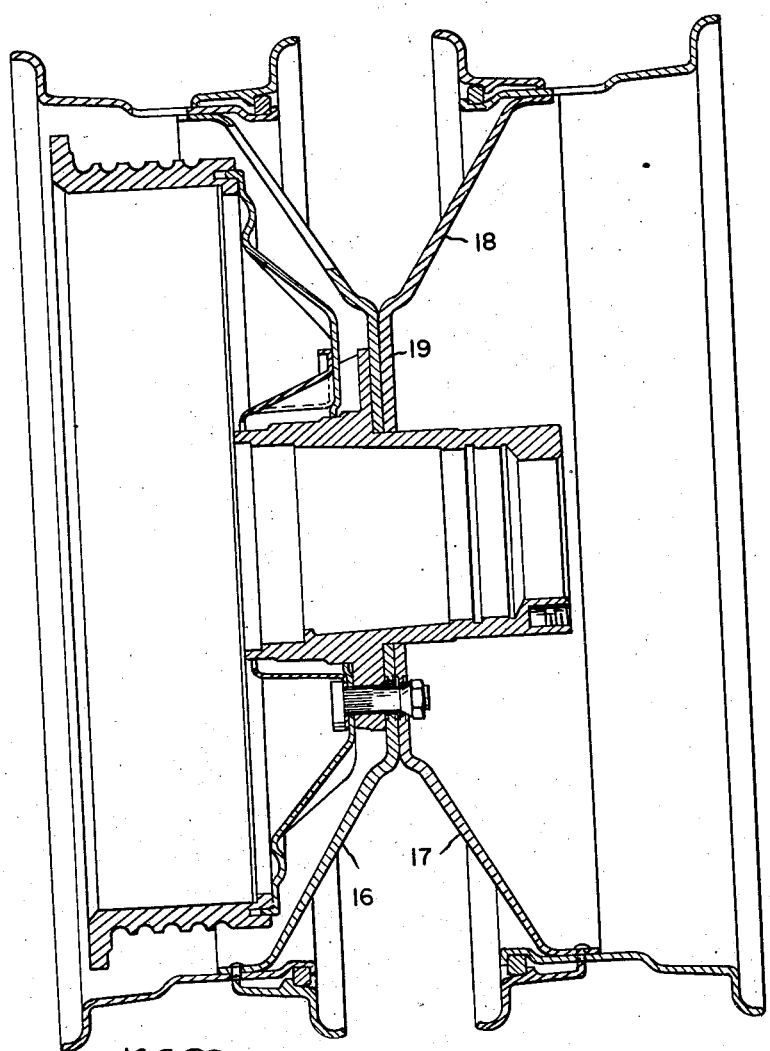
Figure 4 is a view similar to Figure 1 showing another embodiment of the invention.
Figure 3:
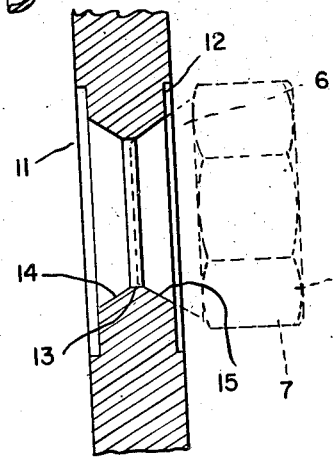
Figure 3 is an enlarged view of a portion of Figure 2.

As illustrated particularly in Figures 1 and 2 the wheel is a motor vehicle wheel comprising the hub member 1 and the wheel body 2. The hub member is formed with the fixed radial flange 3 and has the annular series of axially extending transverse bolts 4 fixedly secured to the flange and formed with threaded shanks for receiving the nuts 5 which have the convex portions 6 and the polygonal wrench engaging portions 7, the convex portions being frusto-conical in shape and tapering away from the polygonal wrench engaging portions.

The wheel body is a sheet steel dished disk having the peripheral flange 8 to which the tire carrying rim 9 is secured and also having the central substantially radial mounting portion 10 adapted to be secured against the outboard side of the radial flange 3 by the securing bolts and nuts 4 and 5 respectively.

The mounting portion is countersunk in its opposite sides to form the annular series of pairs of like recesses 11 and 12 which are substantially axially aligned and together form the resilient parts 13 of reduced thickness. These resilient parts are formed with central holes therethrough

2 in substantial axial alignment with and connecting the recesses and the concave sockets 14 and 15 are formed at the opposite ends of the holes, the sockets being frusto-conical in shape to fit the frusto-conical portions 6 of the nuts 5. The sockets are of less diameter than the recesses so that the resilient parts are flexible and the receiving nuts when tightened down flex the resilient parts thereby resiliently securing the parts of the mounting portion encircling the recesses at the other side of the resilient parts against the radial flange.

The construction is such that the wheel body is reversible in that it may be mounted with either side of its mounting portion against the fixed radial flange of the hub member by the securing nuts acting through and flexing the resilient parts of the mounting portion. Furthermore, the construction is such that the securing nuts are effectively held from accidental disengagement by reason of the resiliency of the flexed resilient parts and the wedging action of the nuts on the resilient parts.

As illustrated in Figure 4, two wheel disks 16 and 17 are mounted on the wheel hub member, it being noted that one of these wheel disks has been reversed. In this construction, each wheel disk is formed in the same manner as the wheel disk 2 and the resiliency of the reduced parts 18 of the mounting portion 19 of the outboard wheel disk is relied upon to effectively clamp the wheel disks to the hub member and prevent accidental disengagement of the clamping nuts.

What I claim is:

1. A vehicle wheel comprising a hub member having a radial flange, a plurality of transverse bolts on said radial flange, a disk having a substantially radial mounting portion provided with pairs of substantially axially aligned recesses in its opposite sides forming resilient parts of reduced thickness between the recesses of each pair, said resilient parts having holes substantially axially aligned with and connecting the recesses of each pair for receiving said bolts, said holes being provided with frusto-conical sockets at their ends, and nuts having frusto-conical portions engaging said sockets at one side of said resilient parts and resiliently securing the parts of said mounting portion encircling the recesses at the other side of said resilient parts against said radial flange.

2. A vehicle wheel comprising a hub member, an annular series of substantially axially extending threaded members on said hub member, nuts for said threaded members, each nut having a frusto-conical boss, and a wheel body having a substantially radial mounting portion provided with pairs of substantially axially aligned recesses in its opposite sides forming between the recesses of each pair a reduced resilient part, said resilient parts having central holes connecting the recesses of each pair for receiving said threaded members, said holes being provided with frusto-conical sockets at their ends for engagement by said frusto-conical bosses of said nuts and said resilient parts being flexed by said nuts and said mounting portion being secured tightly against said hub member.

3. A vehicle wheel comprising a hub member, an annular series of substantially axially extending threaded members on said hub member, a nut for each of said threaded members having a convex boss, and a sheet metal wheel body having a substantially radial mounting portion provided with pairs of recesses in its opposite sides forming resilient parts of reduced thickness, said resilient parts having holes therethrough for receiving said threaded members provided with concave sockets at their ends for receiving said convex bosses of said nuts and said resilient parts being flexed by said nuts and said mounting portion being secured tightly against said hub member.

CHARLES W. SINCLAIR.

No references cited.